United States Patent
DeCusatis et al.

(10) Patent No.: US 9,888,338 B2
(45) Date of Patent: *Feb. 6, 2018

(54) CLOUD BASED EMERGENCY WIRELESS LINK

(71) Applicant: International Business Machines Corporation, Armonk, NY (US)

(72) Inventors: Casimer M. DeCusatis, Poughkeepsie, NY (US); Anuradha Rao, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 293 days.

This patent is subject to a terminal disclaimer.

(21) Appl. No.: 14/502,375

(22) Filed: Sep. 30, 2014

(65) Prior Publication Data

US 2015/0172849 A1 Jun. 18, 2015

Related U.S. Application Data

(63) Continuation of application No. 14/103,991, filed on Dec. 12, 2013.

(51) Int. Cl.
| | |
|---|---|
| *H04W 8/24* | (2009.01) |
| *H04W 4/00* | (2009.01) |
| *H04L 29/08* | (2006.01) |

(52) U.S. Cl.
CPC .............. *H04W 4/008* (2013.01); *H04L 67/04* (2013.01); *H04L 67/10* (2013.01); *H04L 67/1097* (2013.01); *H04L 67/12* (2013.01); *H04W 8/24* (2013.01)

(58) Field of Classification Search
CPC ........ H04W 4/008; H04W 8/24; H04L 67/10; H04L 67/04; H04L 67/1097; H04L 67/12
See application file for complete search history.

(56) References Cited

U.S. PATENT DOCUMENTS

| | | | |
|---|---|---|---|
| 6,496,949 B1 | 12/2002 | Kanevsky et al. | |
| 8,355,707 B2 | 1/2013 | Hagan | |
| 9,157,812 B1 * | 10/2015 | Gennello | ................. G01K 1/14 |

(Continued)

FOREIGN PATENT DOCUMENTS

| | | |
|---|---|---|
| CN | 101655268 A | 2/2010 |
| CN | 202127413 U | 1/2012 |
| CN | 102354261 A | 2/2012 |

*Primary Examiner* — Kim T Nguyen
(74) *Attorney, Agent, or Firm* — Cantor Colburn LLP

(57) ABSTRACT

A method of providing an emergency wireless link in a data center comprising a plurality of servers includes receiving, at an input interface of an emergency wireless link system at the data center, an input from a sensor coupled to one of the plurality of servers or to an auxiliary system among a plurality of auxiliary systems, the plurality of auxiliary systems including a power supply system. The method also includes comparing, using a processor of the emergency wireless link system, the input with a plurality of conditions, declaring an emergency, using the processor, based on the input matching one of the plurality of conditions, outputting, using the processor, one or more messages corresponding with the one of the plurality of conditions based on declaring the emergency, and transmitting the one or more messages wirelessly.

8 Claims, 5 Drawing Sheets

(56) References Cited

U.S. PATENT DOCUMENTS

2006/0218267 A1    9/2006  Khan et al.
2014/0327540 A1*  11/2014  Shin .................. G08B 21/0446
                                                340/539.11
2015/0066557 A1*   3/2015  Lichti ................. H04W 4/028
                                                705/7.15

* cited by examiner

CLOUD BASED EMERGENCY WIRELESS LINK

This application is a continuation of U.S. application Ser. No. 14/103,991 filed Dec. 12, 2013, the disclosure of which is incorporated by reference herein in its entirety.

BACKGROUND

The present invention relates generally to a data center, and more specifically, to a cloud-based emergency wireless link at a data center.

A data center generally refers to a facility that houses computer systems and associated communication and storage systems. A data center may be a collection of networked servers used for storage, processing, and distribution of data. The collection of servers, depending on their size and number, requires a minimum amount of space, power supply, and cooling, among other things. Rather than bear the cost for the resources and maintenance of a data center, many individuals and enterprises have elected to employ cloud-based data centers. These cloud-based data centers provide the services of a local data center for a fee without the infrastructure cost of a local data center. These data centers are accessible to the users via the internet, for example, and are maintained by a cloud service provider. The services provided by the cloud-based data center may include data storage, processing, and distribution, for example. The data may be secure and may require a decryption key or password for access. Other data, though not encrypted or password-protected, may be considered sensitive. Reliability of access (the ability to access the data when desired) may be a key factor in selecting a particular cloud service provider. Thus, maintaining the integrity of a cloud-based data center, like maintaining the integrity of a local data center, is essential for users. However, unlike a local data center, which may be in a room in the same office building of an enterprise, a cloud-based data center is remote for the users and accessible only by the established modes of communication (e.g., via the internet). A cloud-based data center may also be remote to the cloud service provider. As a result, the conditions at the data center may not be readily discernable.

SUMMARY

Embodiments include a system, method, and computer program product for transmitting a message using an emergency wireless link system. A method of providing an emergency wireless link in a data center comprising a plurality of servers is also described. The method includes receiving, at an input interface of an emergency wireless link system at the data center, an input from a sensor coupled to one of the plurality of servers or to an auxiliary system among a plurality of auxiliary systems. The plurality of auxiliary systems includes a power supply system. The method also includes comparing, using a processor of the emergency wireless link system, the input with a plurality of conditions, and declaring an emergency, using the processor, based on the input matching one of the plurality of conditions. The method further includes outputting, using the processor, one or more messages corresponding with the one of the plurality of conditions based on declaring the emergency, and transmitting the one or more messages wirelessly.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
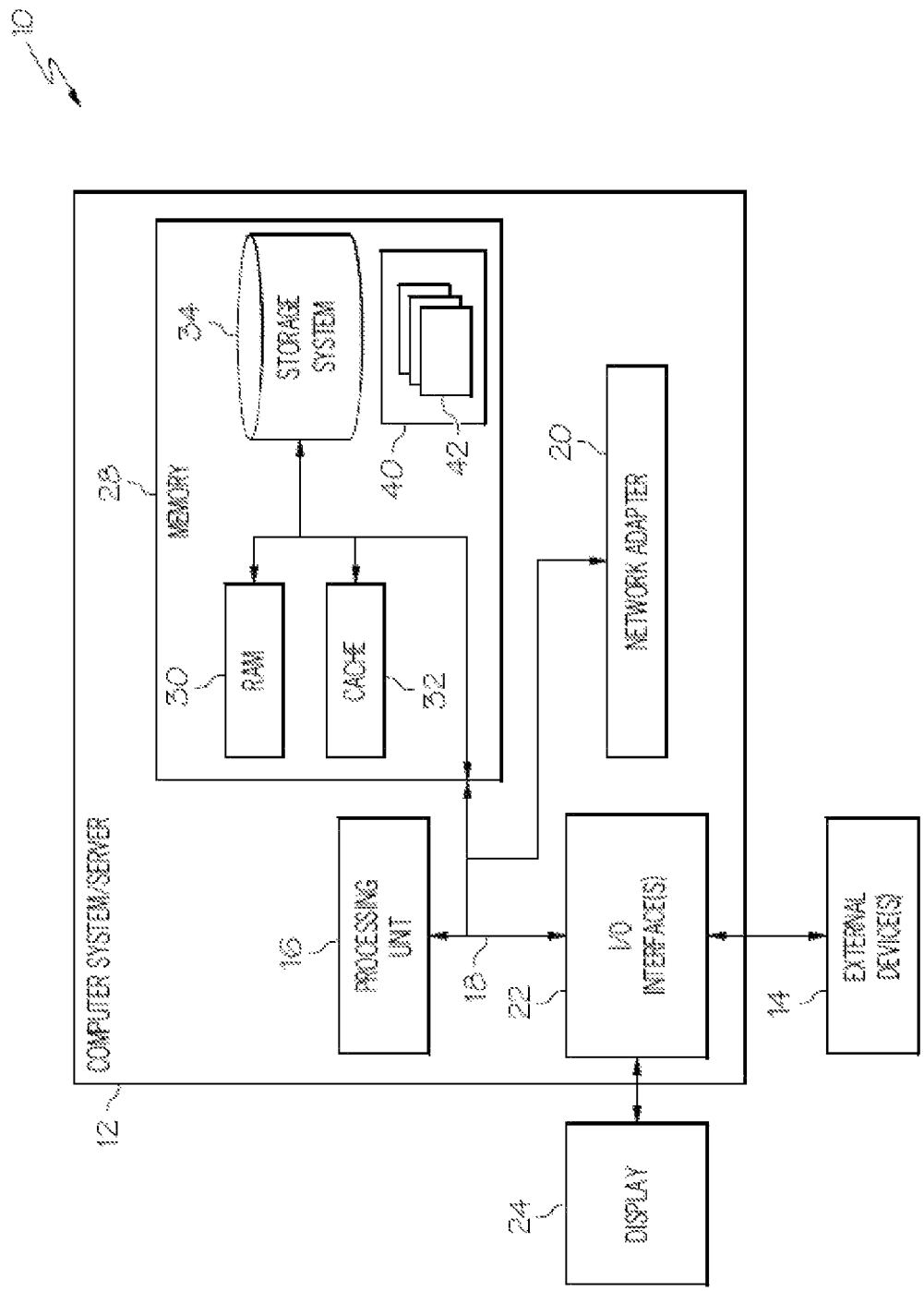
FIG. 1 depicts a cloud computing node according to an embodiment of the present invention.

A cloud-based emergency wireless link, embodiments of which are discussed herein, facilitates management and maintenance of cloud-based data centers. The embodiments discussed herein apply, as well, to any remote equipment.

As noted above, a cloud service provider may use a remote management center to manage a cloud data center. As a result of the data center being remote from both users and the management center, the reliability and integrity of a remote (cloud-based) data center may be compromised or feared to be compromised when the data center is not accessible. Typically, wireless communication is avoided within a data center. This is because radiated noise at a particular radio frequency may interfere with the equipment in the data center.

Embodiments detailed herein relate to a wireless link that transmits information only after a disaster has been determined to have occurred and an emergency has been declared. At the outset, cloud computing is generally described below.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
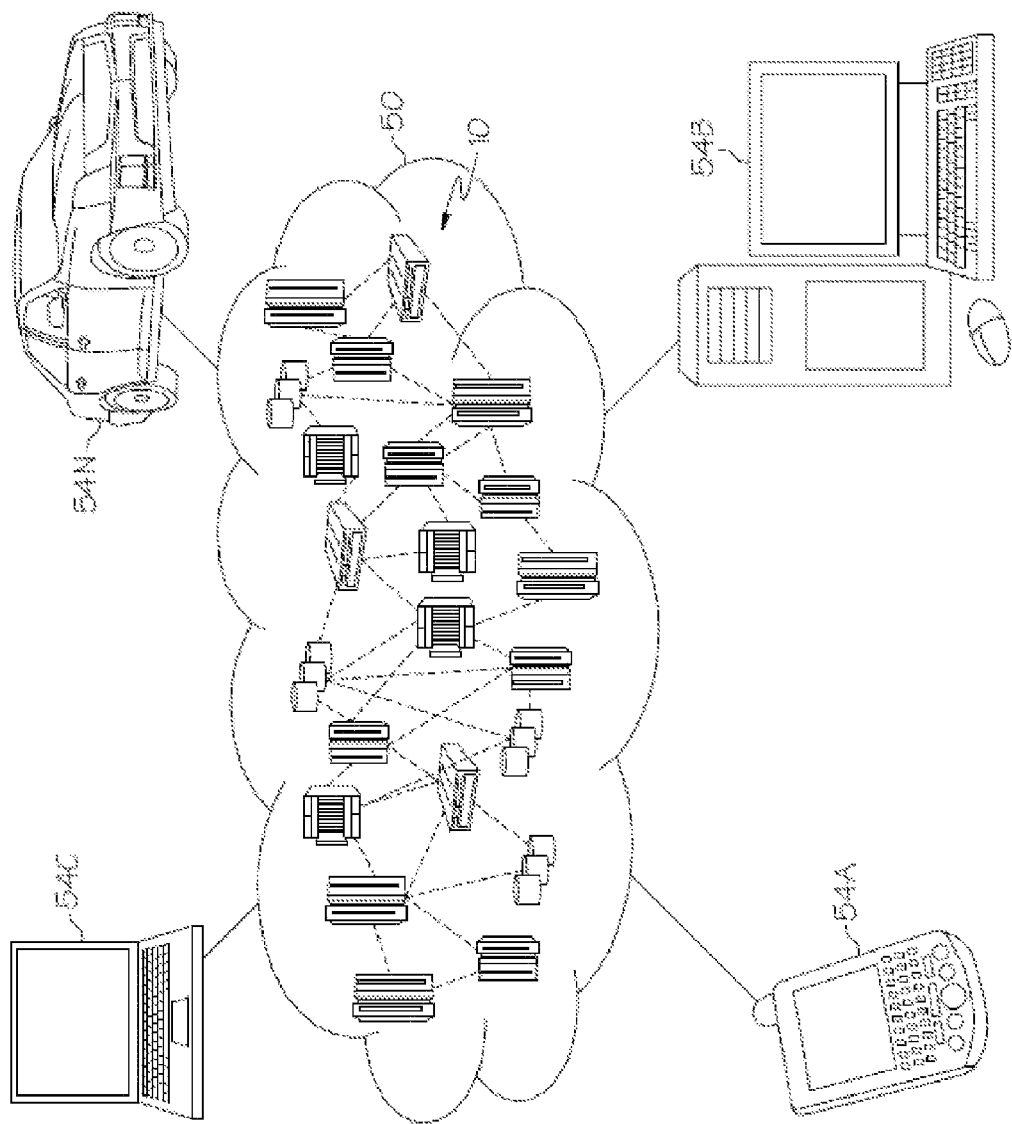
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
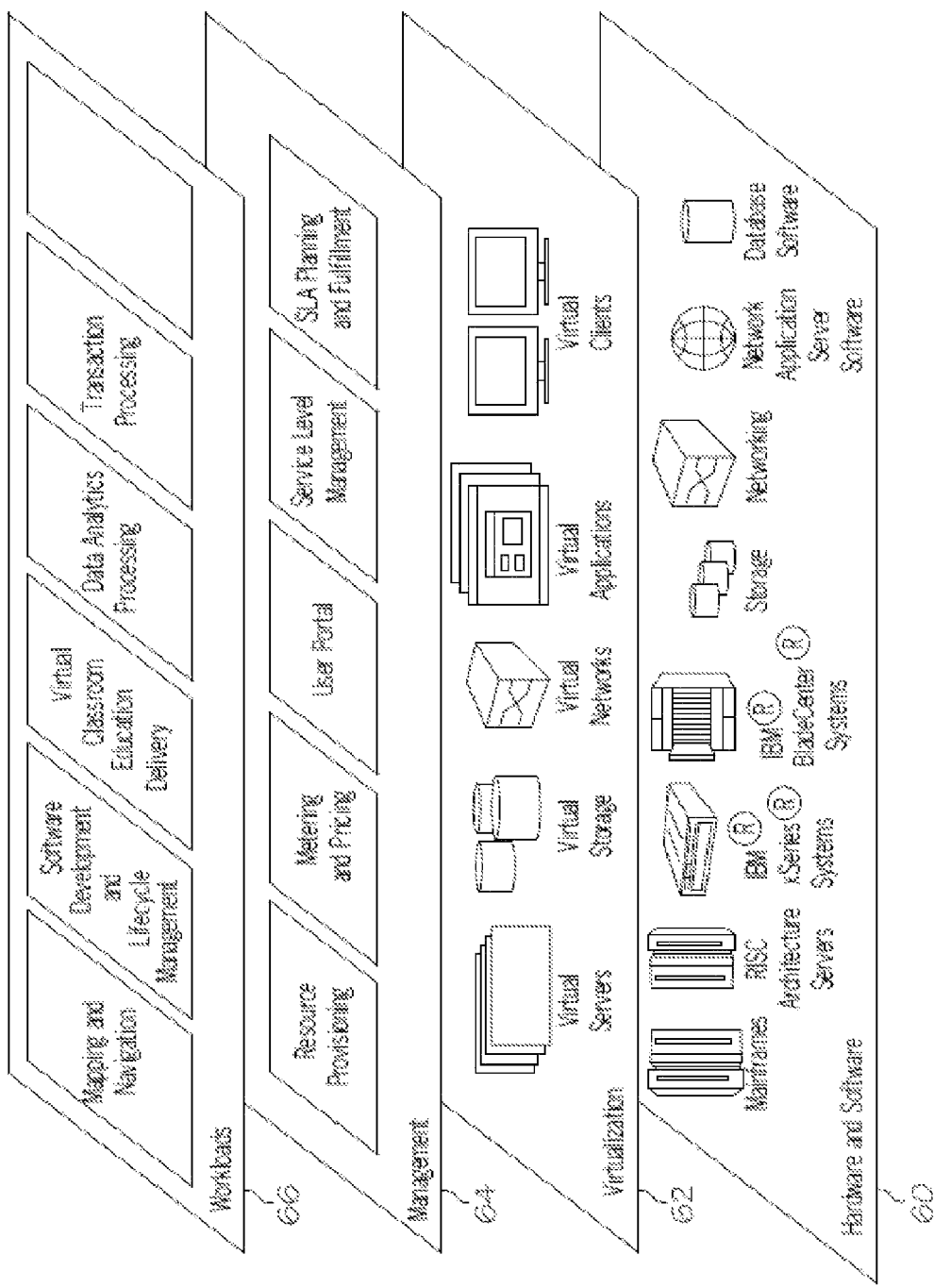
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

Figure 4:
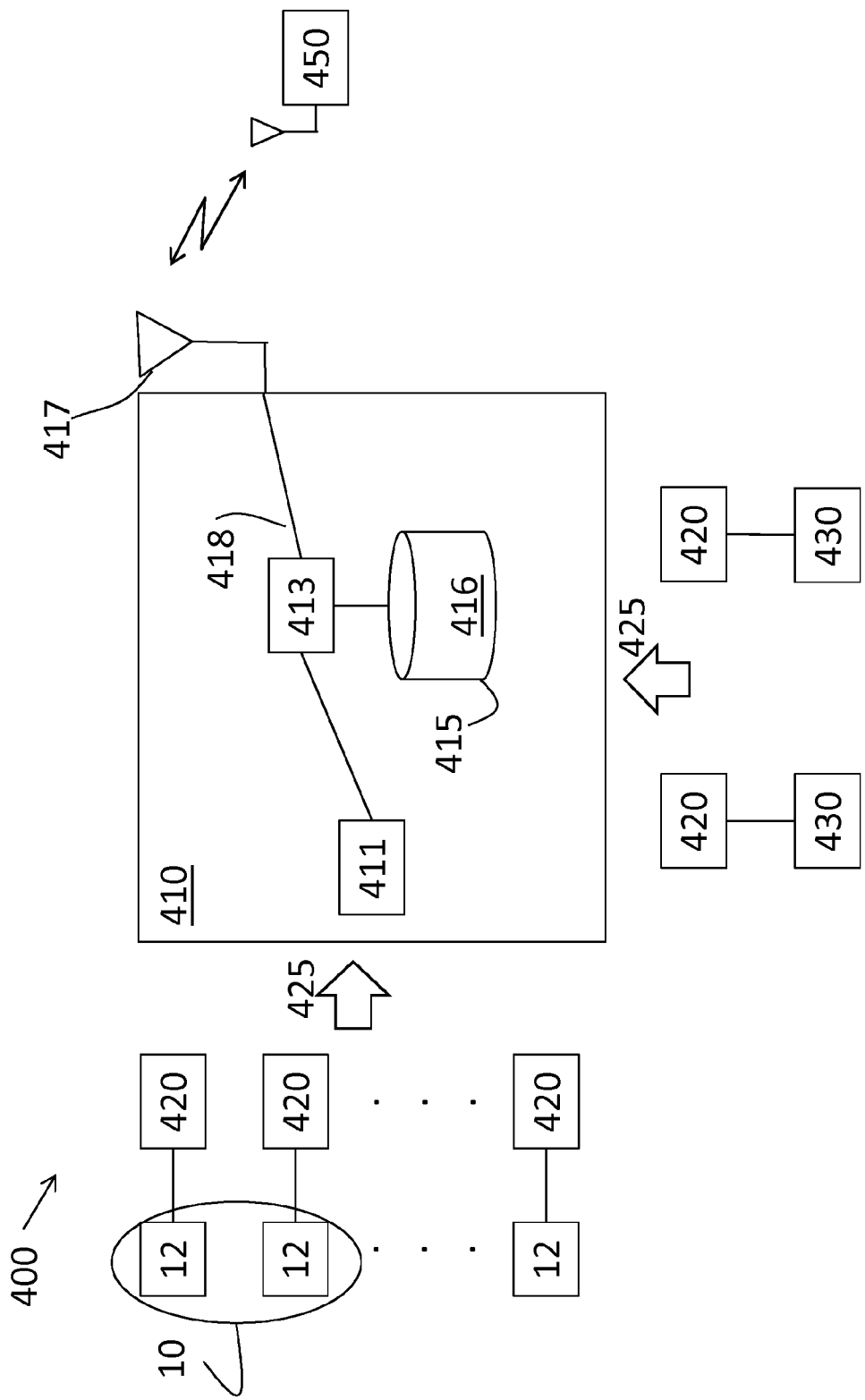
FIG. 4 depicts an emergency wireless link system in a data center according to an embodiment.

FIG. 4 depicts an emergency wireless link system 410 in a data center 400 according to an embodiment. According to various embodiments, the data center 400 is a remote or cloud-based data center. As described above, one or more cloud computing nodes 10 may be physically grouped together in the data center 400. Each node 10 may include one or more servers 12. The exemplary remote or cloud-based data center 400 shown in FIG. 4 includes one or more nodes 10 with one or more servers 12. One or more of the servers 12 is coupled to a monitoring device or sensor 420. Sensors 420 may also be coupled to one or more auxiliary systems 430. An exemplary auxiliary system 430 may be a fire suppressant system. Another exemplary auxiliary system 430 may be the power supply system for the data center 400. Yet another auxiliary system 430 may be the temperature control system for the data center 400. Each sensor 420 may be coupled to a server 12 or auxiliary system 430 wirelessly or through one or more wires. The sensors 420 (and the emergency wireless link system 410) may be battery powered or include auxiliary power sources such as batteries. An input interface 411 of the emergency wireless link system 410 receives one or more inputs 425 from one or more sensors 420. A given sensor 420 may include a processor to interpret information from a server 12 or auxiliary system 430. In this case, the input 425 provided by the sensor 420 may be status information rather than raw information. That is, the input 425 may indicate a time and duration during which the fire suppressant system (auxiliary system 430) was activated, for example. As another example, the input 425 may indicate that the temperature in the data center 400 is below a minimum threshold temperature or above a maximum threshold temperature. In alternate embodiments, a given sensor 420 may pass on some or all of the information it receives from a server 12 or auxiliary system 430. In this case, the input 425 must be interpreted by the emergency wireless link system 410.

Specifically, a processor 413 of the emergency wireless link system 410 receives the input 425 received through the input interface 411 and, based on the type of input 425, may first interpret the information in the input 425 to determine a status of the server 12 or auxiliary system 430 corresponding with the input 425. The processor 413 accesses a set of rules or conditions 416 from a storage device 415. Both the processor 413 and storage device 415 may be used for other functions of the data center 400 in addition to the emergency wireless link function detailed herein. The processor 413 determines if one or more of the inputs 425 matches a condition 416. When the processor 413 determines that there is a match between one or more inputs 425 and a condition 416 in the storage device 415, the processor 413 sends a message 418 to the transmitter 417 for transmission. A match between an input 425 and a condition 416 indicates that a disaster has occurred that effects the data center 400, and an emergency is declared or determined by the processor 413.

The message 418 provided by the processor 413 for transmission by the transmitter 417 of the emergency wireless link system 410 corresponds with the condition 416 with which one or more inputs 425 matched. For example, if the power system (auxiliary system 430) indicates a failure through an input 425, the message 418 resulting from a match of that input 425 with one of the conditions 416 may be different than if the fire suppressant system (auxiliary system 430) indicates that it has been activated to suppress a fire or if a server 12 indicates that it has failed. In alternate embodiments, a match between an input 425 and any condition 416 may result, additionally or alternatively, in the same transmission (same message 418) being sent by the transmitter 417. That is, a general message 418 may correspond, additionally or alternatively, with more than one condition 416. The transmission may be within a range of frequencies that is monitored by a monitoring center 450. The transmission may be a shortwave or any radio frequency transmission. The transmission may alternately or additionally be WiFi or cellular. The transmitter 417 may first send a poll signal to determine which transmission media are congested and which are available. For example, the transmitter 417 may test for a dial tone (telephone network) or a ping (WiFi). The wireless transmission by the transmitter 417 may be done in short bursts using a packet structure. This may be especially helpful because cellular and other networks may become congested following a disaster, and shorter bursts may be easier to transmit over the congested networks. The message 418 transmitted by the emergency wireless link system 410 may provide information regarding the disaster or the servers 12 and auxiliary systems 430 currently not operating, for example. The number and types of information transmitted based on the messages 418 are not limited in any way. The transmission may require security credentials for access. The security credentials may include a password or encryption key. That is, the processor 413 may output one or more messages 418 as password-protected or encrypted messages for transmission by the transmitter 417.

According to embodiment, the transmitter 417 may additionally transmit emergency wireless link system 410 status to the monitoring center 450. In this case, the power sources powering the sensors 420 and emergency wireless link system 410 are monitored for critical charge levels that are stored in the storage device 415. The monitored levels may be a routine message 418 forwarded to the transmitter 417 for transmission to the monitoring center 450. The information in the routine message 418 regarding charge levels may trigger replacement of a battery at the data center 400, for example.

The monitoring center 450 may identify a transmission from the emergency wireless link system 410 by receiving all transmissions within a predefined frequency range and determining if any of the transmissions require the credentials known to be required for a transmission from the emergency wireless link system 410. The monitoring center 450 may be a passive receiving site which stores any received packets from the emergency wireless link system 410 for retrieval by a user who accesses the monitoring center 450. The user may in turn be required to provide security credentials to the monitoring center 450 to have the messages 418 forwarded. In alternate embodiments, the monitoring center 450 may be active and may transmit an alert to one or more users or sites based on receiving a message 418 from the emergency wireless link system 410.

Figure 5:
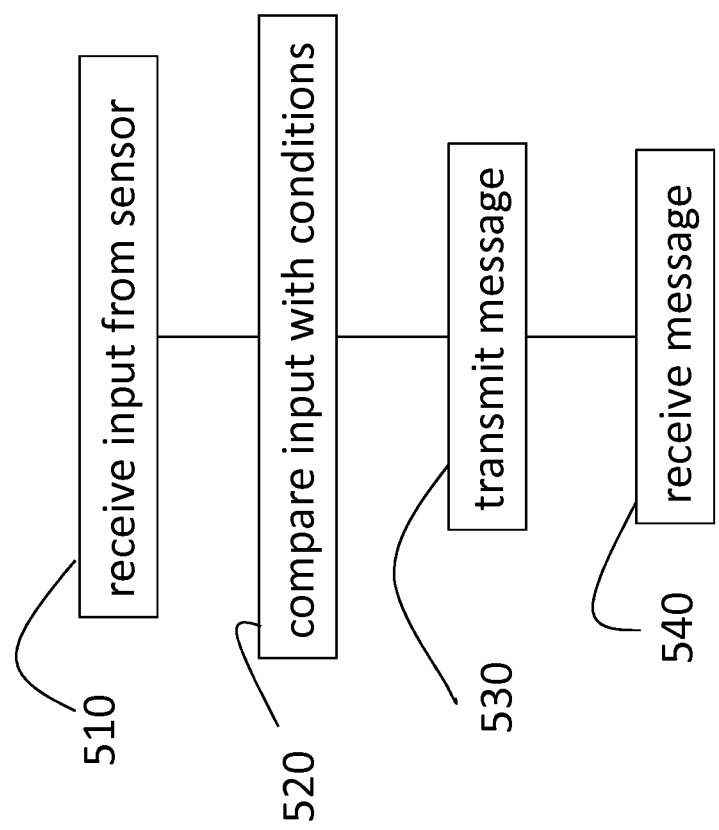
FIG. 5 is a process flow of a method of transmitting a message using an emergency wireless link system according to one or more embodiments.

FIG. 5 is a process flow of a method of transmitting a message 418 using an emergency wireless link system 410 according to one or more embodiments. At block 510, receiving input 425 from a sensor 420 includes an input interface 411 of the emergency wireless link system 410 receiving inputs 425 from one or more sensors 420 coupled to one or more servers 12 and one or more auxiliary systems 430. The input 425 may be status information based on a pre-processing of the information received at the sensor 420 or may be raw data. Each of the sensors 420 may communicate with both the corresponding monitored system (server 12 or auxiliary system 430) and the emergency wireless link system 410 through one or more wires or wirelessly. At block 520, comparing the input 425 with conditions 416 includes a processor 413 of the emergency wireless link system 410 comparing either the input 425, as received, or a processed input 425 if raw data is received with conditions 416 stored in a storage device 415. As noted above, some exemplary conditions 416 may be a power outage, a temperature in the data center 400 falling below a minimum threshold temperature or exceeding a maximum threshold temperature, or the fire suppressant system being activated. The transmitting of the message 418 at block 530 occurs when the processor 413 determines that an input 425 matches a condition 416. A match indicates that a disaster (some form of outage) has occurred at the data center 400 and the processor 413 declares an emergency, thereby starting transmission of the one or more messages 418 by the transmitter 417. The one or more messages 418 may be transmitted in any of the exemplary ways discussed above and may be transmitted in association with security credentials. At block 540, receiving the message 418 from the emergency wireless link system 410 may include providing a password or decryption key to access the message 418 and forwarding an alert based on the message 418.

Technical effects and benefits include the wireless transmission of messages 418 indicating status and other information following a disaster at a remote or cloud-based data center 400.

As will be appreciated by one of average skill in the art, aspects of embodiments may be embodied as a system, method or computer program product. Accordingly, aspects of embodiments may take the form of an entirely hardware embodiment, an entirely software embodiment (including firmware, resident software, micro-code, etc.) or an embodiment combining software and hardware aspects that may all generally be referred to herein as, for example, a "circuit," "module" or "system." Furthermore, aspects of embodiments may take the form of a computer program product embodied in one or more computer readable storage device(s) having computer readable program code embodied thereon.

One or more of the capabilities of embodiments can be implemented in software, firmware, hardware, or some combination thereof. Further, one or more of the capabilities can be emulated.

An embodiment may be a computer program product for enabling processor circuits to perform elements of the invention, the computer program product comprising a computer readable storage medium readable by a processing circuit and storing instructions for execution by the processing circuit for performing a method.

The computer readable storage medium (or media), being a tangible, non-transitory, storage medium having instructions recorded thereon for causing a processor circuit to perform a method. The "computer readable storage medium" being non-transitory at least because once the instructions are recorded on the medium, the recorded instructions can be subsequently read one or more times by the processor circuit at times that are independent of the time of recording. The "computer readable storage media" being non-transitory including devices that retain recorded information only while powered (volatile devices) and devices that retain recorded information independently of being powered (non-volatile devices). An example, non-exhaustive list of "non-transitory storage media" includes, but is not limited to, for example: a semi-conductor storage device comprising, for example, a memory array such as a RAM or a memory circuit such as latch having instructions recorded thereon; a mechanically encoded device such as punch-cards or raised structures in a groove having instructions recorded thereon; an optically readable device such as a CD or DVD having instructions recorded thereon; and a magnetic encoded device such as a magnetic tape or a magnetic disk having instructions recorded thereon.

A non-exhaustive list of examples of computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM). Program code can be distributed to respective computing/processing devices from an external computer or external storage device via a network, for example, the Internet, a local area network, wide area network and/or wireless network. The network may comprise copper transmission cables, optical transmission fibers, wireless transmission, routers, firewalls, switches, gateway computers and/or edge servers. A network adapter card or network interface card in each computing/processing device receives a program from the network and forwards the program for storage in a computer-readable storage device within the respective computing/processing device.

Computer program instructions for carrying out operations for aspects of embodiments may be for example assembler code, machine code, microcode or either source or object code written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable storage medium that can direct a computer, other programmable data processing apparatus, or other devices to function in a particular.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of providing an emergency wireless link in a data center comprising a plurality of servers, the method comprising:
   receiving, at an input interface of an emergency wireless link system at the data center, an input from a sensor coupled to the plurality of servers or to a plurality of auxiliary systems, the plurality of auxiliary systems including a power supply system;
   comparing, using a processor of the emergency wireless link system, the input with a plurality of conditions, the plurality of conditions compared with the input by the processor including a power outage and a fire suppression system being activated;
   declaring an emergency, using the processor, based on the input matching one of the plurality of conditions;
   outputting, using the processor, one or more messages corresponding with the one of the plurality of conditions based on declaring the emergency; and
   transmitting the one or more messages wirelessly.

2. The method according to claim 1, wherein the receiving the input from the sensor includes receiving a status of one of the plurality of servers or one of the auxiliary systems based on processing by the sensor.

3. The method according to claim 1, wherein the receiving the input from the sensor includes receiving data output by one of the plurality of servers or one of the auxiliary systems and passed on by the sensor.

4. The method according to claim 1, wherein the transmitting the one or more messages includes using one or more of a cellular, WiFi, or shortwave frequency channel.

5. The method according to claim 1, wherein the transmitting the one or more messages includes transmitting password-protected or encrypted transmissions.

6. The method according to claim 1, wherein the receiving the input from the sensor includes receiving the input from the sensor coupled to a temperature control system or a fire suppression system.

7. The method according to claim 6, wherein the comparing the input to the plurality of conditions includes comparing the input to a temperature below a minimum threshold temperature or above a maximum threshold temperature.

8. The method according to claim 1, wherein the outputting the one or more messages includes outputting a critical charge level of the sensor.

* * * * *